United States Patent Office
3,382,236
Patented May 7, 1968

3,382,236
OXYPROPYLATED SUCROSE PHOSPHITES
Alvin Guttag, Bethesda, Md., assignor to Weston Chemical Corporation, Newark, N.J., a corporation of New Jersey
No Drawing. Filed July 23, 1965, Ser. No. 474,459
13 Claims. (Cl. 260—234)

ABSTRACT OF THE DISCLOSURE

Poly hydrocarbyl (or poly haloaryl) sugar-lower alkylene oxide adduct polyphosphites having two hydrocarbyl or haloaryl groups per phosphorus atom and having a phosphorus atom replacing each hydroxy hydrogen atom of the sugar-alkylene oxide adduct are prepared by reacting a sugar-lower alkylene oxide adduct with at least one mol of a trihydrocarbyl or trihaloaryl phosphite. The products are useful as stabilizers for polymers.

---

This invention relates to the preparation of phosphite esters.

It is an object of the present invention to prepare novel phosphite esters.

Another object is to prepare phosphite esters having good thermal stability.

A further object is to prepare phosphite esters having excellent hydrolytic stability.

An additional object is to impart improved stability to polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing poly hydrocarbyl (or poly haloaryl) sugar-alkylene oxide adduct polyphosphites where there are two hydrocarbyl and/or haloaryl groups for each phosphorus atom. The compounds have 4 to 8 phosphorus atoms and corresponding 8 to 16 hydrocarbyl and/or haloaryl groups. Thus when the sugar is sucrose, the compounds have the formula

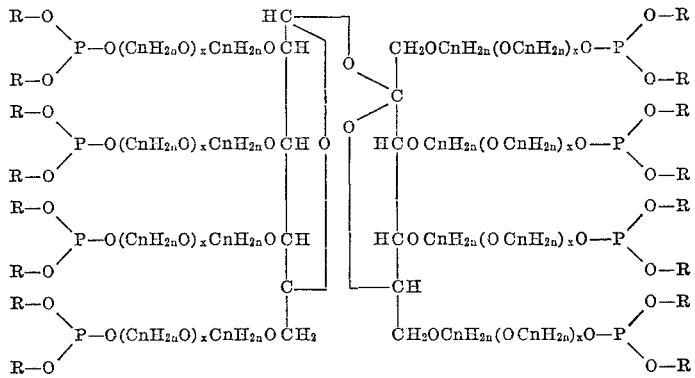
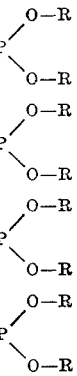

(I)

where the R's are the same or different and are hydrocarbyl or haloaryl, e.g., alkyl, carbocyclic aryl, e.g., phenyl or alkylphenyl, or halophenyl; $x$ is zero or a positive integer, e.g., 1, 2, 3, 4 or 5 and $n$ is a small integer above 1, e.g., 2, 3 or 4. In the above formula for sake of clarity the positions of the hydrogen atoms and the other groups have not been placed in their correct stereometric positions.

If glucose or similar hexoses are used as the sugar then the formula of the product can be represented as

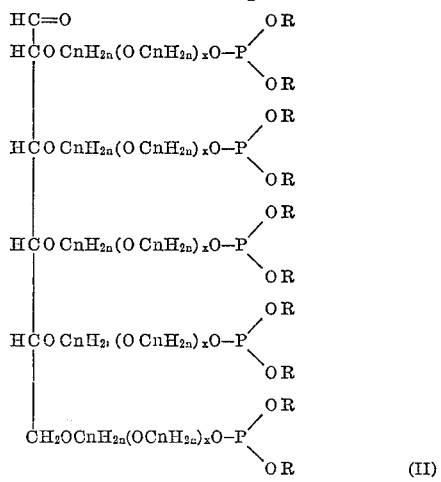

(II)

where R, $n$ and $x$ are as defined above.

In Formula II the correct stereometric positions of the hydrogen atoms and the other groups also are not set forth for reasons of clarity. While the glucose derivative in Formula II is shown in the aldhyde form, actually most of the product will contain the glucose portion of the molecule in the pyranoside form.

The compounds of the invention are conveniently prepared by reacting a sugar-lower alkylene oxide adduct with a trialkyl phosphite, a triaryl phosphite, a trihaloaryl phosphite, an aryl dialkyl phosphite or a diaryl alkyl phosphite or a mixture of such phosphites in the presence of a catalyst. Sometimes it is more convenient to use a mixture of a triaryl phosphite and a low boiling phenol with either a high boiling phenol or high boiling alcohol to form the phosphite of the high boiling phenol or alcohol.

As the starting phosphite there can be used alkyl, aryl and haloaryl phosphites such as trimethyl phosphite, triethyl phosphite, tripropyl phosphite, triamyl phosphite, tris octyl phosphite, tris isooctyl phosphite, tris decyl phosphite, tris isodecyl phosphite, tris octadecyl phosphite, tris dodecyl phosphite, triphenyl phosphite, tri-o-cresyl phosphite, tri-p-cresyl phosphite, tri-m-cresyl phosphite, tri xylenyl phosphite, tri ethylphenyl phosphite, tri butylphenyl phosphite, tri-p-chlorophenyl phosphite, tri-o-chlorophenyl phosphite, tri 2,4-dichlorophenyl phosphite, tri 2,4,5-trichlorophenyl phosphite, tri 2,4,6-trichlorophenyl phosphite, tri-p-bromophenyl phosphite, tri pentachlorophenyl phosphite, phenyl diiodecyl phosphite, diphenyl decyl phosphite, tri α-naphthyl phosphite, o-cresyl dioctadecyl phosphite, m-cresyl di octyl phosphite, di p-cresyl hexyl phosphite, tri dodecylphenyl phosphite.

As the high boiling alcohol or phenol which can be used with a triaryl phosphite of a relatively low boiling phenol, there can be used octylphenol, nonyl phenol, t-octyl phenol, dodecyl phenol, pentachlorophenol, pentabromophenol, butyl phenol, decyl alcohol, isodecyl alcohol, dodecyl alcohol, octyl alcohol, octadecyl alcohol, eicosanyl alcohol.

As the catalyst there can be used a dihydrocarbon phosphite or an alkaline catalyst in an amount of 0.05–5% by weight of the trihydrocarbyl or trihaloaryl phosphite reactant. Thus as catalysts there can be used dialkyl or diaryl phosphites such as diphenyl phosphite, di-o-cresyl phosphite, di-p-cresyl phosphite, di-decyl phosphite, diisodecyl phosphite, dioctadecyl phosphite, dimethyl phosphite, diethyl phosphite or dihalohydrocarbyl phosphites such as di-o-chlorophenyl phosphite, di-2,4-dichlorophenyl phosphite or alkaline catalysts such as sodium phenolate, sodium methylate, sodium cresylate, potassium phenolate, sodium isodecylate. The alkaline catalysts preferably have a pH of at least 11 in a 0.1 solution.

As the sugar-lower alkylene oxide adducts there can be employed the adducts of a sugar such as sucrose, glucose, fructose, maltose, mannose, rhamnose, gentiobiose, sorbose, arabinose, ribose, xylose, idose, lyxose or lactose with alkylene oxides such as ethylene oxide, propylene oxide, 1,3-butylene oxide, trimethylene oxide, 1,2-butylene oxide and 1,4-butylene oxide. Such adducts have molecular weights of up to 3000 or more but usually have molecular weights of not over 1500. The preferred adducts have approximately 1–1.5 moles of alkylene oxide for each available hydroxyl group on the sugar.

It is important that there be used at least one mole of the tertiary phosphite for each hydroxyl group available on the sugar-alkylene oxide adduct to insure that the reaction product does not contain reactive hydroxyl groups of the type which occur when there is employed for example 3 moles of octakis (2-hydroxypropyl) sucrose with 1 mole of triphenyl phosphite to produce tris (octakis 2-hydroxypropyl) sucrose. The free hydroxyl groups are reactive and for certain stabilizer uses are undesired.

The compounds of the present invention are useful as stabilizers for vinyl chloride resins, e.g., polyvinyl chloride, vinylchloride-vinyl acetate copolymer (87:13), vinyl chloride-vinylidene chloride (95:5), vinyl chloride-acrylonitrile (80:20). They are also useful as stabilizers for olefin polymers, e.g., polymers of monoolefins such as polyethylene, polypropylene, ethylene copolymers with monoolefins having 3–10 carbon atoms, e.g., ethylene propylene copolymer (50:50; 80:20; 20:80), ethylene-butene-1 copolymer, ethylene-isobutylene copolymer, ethylene-hexene-1 copolymer and ethylene decene-1 copolymer; ethylene - propylene - cyclopentadiene terpolymer (70:25:5); polyolefin polymers, e.g., natural rubber, butadiene - styrene copolymer (SBR rubber), cis isoprene polymer, etc. The compounds of the invention are used in an amount of 0.1–10% by weight of the polymer when employed as thermal or oxidation stabilizers.

Unless otherwise indicated, all parts and percentages are by weight.

The compounds of the present invention in general are viscous liquids.

Examples of compounds within the present invention are hexadeca (phenyl) octakis (2-hydroxypropyl) sucrose octaphosphite, hexadeca (isodecyl) octakis (2-hydroxypropyl) sucrose octaphosphite, hexadeca (p-nonylphenyl) octakis (2-hydroxypropyl) sucrose octaphosphite, octa (phenyl) octa (isodecyl) octakis (2-hydroxypropyl) sucrose octaphosphite, hexadecaphenyl octakis (2-hydroxypropoxypropyl) sucrose octaphosphite, hexadeca (p-dodecylphenyl) octakis (2-hydroxypolypropoxypropyl) sucrose octaphosphite where there are an average of 3 propoxy units in each polypropoxy group, hexadeca (o-nonylphenyl) octakis (hydroxyethyl) sucrose octaphosphite, hexadeca (dodecyl) octakis (hydroxyethoxyethyl) sucrose octaphosphite, hexadeca (p-octylphenyl) octakis (2-hydroxybutyl) sucrose octaphosphite, hexadeca (pentachlorophenyl) octakis (2-hydroxypropyl) sucrose octaphosphite, hexadeca (pentabromophenyl) octakis (2-hydroxypropoxypropyl) sucrose octaphosphite, hexadeca (pentachlorophenyl) octakis (1-hydroxybutyl) sucrose ostaphosphite, hexadeca (p-chlorophenyl) octakis (2-hydroxypropyl) sucrose octaphosphite, hexadeca (octadecyl) octakis (2-hydroxypropyl) sucrose octaphosphite, hexadeca (p-cresyl) octakis (2-hydroxypropyl) sucrose octaphosphite, hexadeca (2-ethylhexyl) octakis (2-hydroxypropyl) sucrose octaphosphite, hexadeca (hexyl) octakis (2-hydroxypropyl) sucrose octaphosphite, hexadeca (methyl) octakis (2-hydroxypropyl sucrose octaphosphite, hexadeca (isooctyl) octakis (2-hydroxypropyl) sucrose octaphosphite, hexadeca (2,4,5-trichlorophenyl) octakis (2-hydroxypropyl) sucrose octaphosphite, hexadeca (2,4,6-trichlorophenyl) octakis (2-hydroxypropyl) sucrose octaphosphite, hexadeca (2,4,6-tribromophenyl) octakis (2-hydroxypropyl) sucrose octaphosphite, hexadeca (phenyl) octakis (1-hydroxypropyl) sucrose octaphosphite, deca (p-nonylphenyl) penta (2-hydroxypropyl) fructose pentaphosphite, deca (p-nonylphenyl) penta (2-hydroxypropyl) mannose pentaphosphite, deca (o-octylphenyl) penta (2-hydroxypropyl) galactose pentaphosphite, deca (2,4,6-trichlorophenyl) penta (hydroxyethyl) sorbose pentaphosphite, deca (p-butylphenyl) penta (2-hydroxypropoxypropyl) glucose pentaphosphite.

The Voranols are commercially available oxypropylated sucroses and differ only in the amount of oxypropylation. These Voranols have the following properties:

| Voranol | Mol. wt. | Percent OH | OH equiv. | OH number | Mols of propylene oxide/mol of sucrose |
|---|---|---|---|---|---|
| RS 350 | 1,356 | 10.78 | 157 | 350 | 17.4 |
| RS 375 | 1,304 | 11.3 | 150.5 | 375 | 16.6 |
| RS 410 | 1,133 | 11.95 | 142.3 | 410 | 13.8 |
| RS 450 | 1,000 | 13.62 | 124.8 | 443 | 11.4 |
| RS 530 | 856 | 15.8 | 108 | 528 | 9 |

All of the Voranols are suitable for use according to the invention.

In addition to their other uses the phosphites of the present invention are useful as stabilizers for glycols, e.g. dipropylene glycol, polypropylene glycol 2025 and diethylene glycol as well as polyhydric alcohol-alkylene oxide adducts, e.g., glycerine-propylene oxide adduct, molecular weight 3000. Furthermore, they are useful as stabilizers for polyurethanes and as flame proofing agents for polyurethanes, polyethylene, polypropylene, cellulose and cellulose esters, polystyrene, etc.

Example 1

1 mole of octakis (2-hydroxypropyl) sucrose was mixed with 8 moles of triphenyl phosphite and 0.1 mole of diphenyl phosphite as a catalyst and subjected to vacuum distillation. Terminal conditions were 152° C. and 10 torr. The removal of phenol was nearly quantitative. The distillation residue was treated with 20 grams of soda ash and 20 grams of filter aid and filtered. The filtrate was hexadeca (phenyl) octakis (2-hydroxypropyl) sucrose octaphosphite a somewhat viscous liquid.

Example 2

1 mole of Voranol RS 530, 8 moles of triphenylphosphite, 16 moles of isodecyl alcohol and 0.1 mole diphenyl phosphite (catalyst) were mixed and subjected to vacuum distillation to remove phenol. During distillation an additional 1.2 moles of isodecyl alcohol was added to replace that removed with the phenol. Approximately 98% of the theoretical phenol was removed. Terminal conditions were 193° C. and 10 torr. The distillation residue was treated with 20 grams of dry soda ash, 20 grams of filter aid and filtered. The filtrate was hexadeca (isodecyl) Voranol RS 530 octaphosphite, i.e., it was essentially hexadeca (isodecyl) octakis (2-hydroxypropyl) sucrose octaphosphite, a viscous liquid.

Example 3

1 mole of Voranol RS 430, 5⅓ moles of tris (p-nonylphenyl) phosphite, 2⅔ moles of triphenyl phosphite and 0.1 mole of diphenyl phosphite (catalyst) were mixed and subjected to vacuum distillation. Terminal conditions were 175° C. and 10 torr. Approximately 98% of the theoretical phenol was removed. The distillation residue was treated with 10 grams of soda ash and 10 grams of filter aid. The filtrate was hexadeca (p-nonylphenyl) Voranol RS 530 octaphosphite. It was thermally and hydrolytically stable and was useful in stabilizing polyvinyl chloride and other polymers as set forth above. Thus it can be used in an amount of 3 parts with 100 parts of polyvinyl chloride.

Example 4

1 mole of Voranol RS 530, 8 moles of triphenyl phosphite, 16 moles of 2,4,6-trichlorophenol and 0.1 mole of diphenyl phosphite (catalyst) were mixed and subjected to vacuum distillation until the removal of phenol was almost quantitative. The distillation residue was hexadeca (2,4,6-trichlorophenyl) Voranol RS 530 octaphosphite, a viscous liquid.

Example 5

1 mole of Voranol RS 350, 8 moles of tris (o-cresyl) phosphite and 0.1 mole of diphenyl phosphite (catalyst) were mixed and subjected to vacuum distillation until the removal of cresol was almost complete. The distillation residue was hexadeca (o-cresyl) Voranol RS 530 octaphosphite, a viscous liquid.

Example 6

1 mole of penta (2-hydroxypropyl) dextrose, 3⅓ moles of tris (p-octylphenyl) phosphite, 1⅔ moles of triphenyl phosphite and 0.8 mole of diphenyl phosphite (catalyst) were mixed and subjected to vacuum distillation to remove phenol. The viscous liquid residue was deca (p-octaylphenyl) penta (2-hydroxypropyl) dextrose pentaphosphite.

What is claimed is:

1. A poly hydrocarbyl (or poly halophenyl) sugar-lower alkylene oxide adduct polyphosphite having two hydrocarbyl or halophenyl groups per phosphorus atom and having a phosphorus atom replacing each hydroxyl hydrogen atom of the sugar-alkylene oxide adduct.

2. A compound according to claim 1 which has the formula

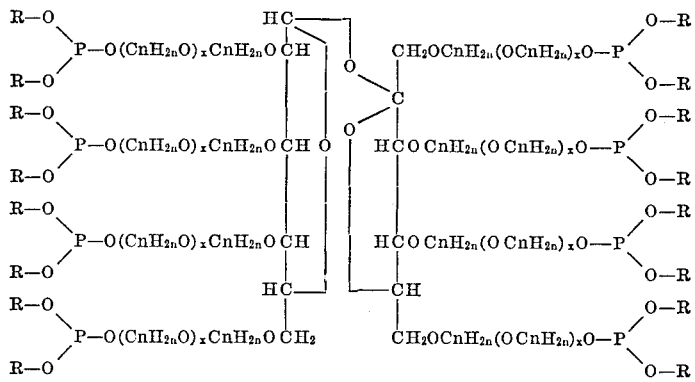

where each R is selected from the group consisting of alkyl, phenyl, alkylphenyl and halophenyl, $x$ is 0 or a positive integer and $n$ is a small integer of at least 2.

3. A compound according to claim 2 wherein $x$ is 0.

4. A compound according to claim 2 wherein the average value of $x$ is between 0 to 2 and $n$ is an integer between 2 and 4.

5. A compound according to claim 1 which is hexadeca (alkyl) octakis (2-hydroxypropyl) sucrose octaphosphite.

6. A compound according to claim 1 which is hexadeca (phenyl) octakis (2-hydroxypropyl) sucrose octaphosphite.

7. A compound according to claim 1 which is hexadeca (alkylphenyl) octakis (2-hydroxypropyl) sucrose octaphosphite.

8. A compound according to claim 7 wherein the alkyl of the alkylphenyl has 8 to 12 carbon atoms.

9. A compound according to claim 1 which is hexadeca (halophenyl) octakis (2-hydroxypropyl) sucrose octaphosphite wherein all of the halogen atoms are chlorine or bromine.

10. A compound according to claim 1 which is deca (alkyl) or deca (phenyl) or deca (alkylphenyl) or deca (halophenyl) penta (hydroxyalkyl) glucose pentaphosphite.

11. A polyphosphite according to claim 1 wherein the sugar is selected from the group consisting of sucrose, glucose, fructose, maltose, mannose, rhamnose, gentiobiose, sorbose, arabinose, ribose, xylose, idose, lyxose and lactose.

12. A polyphosphite according to claim 11 wherein the hydrocarbyl is selected from the group consisting of alkyl, phenyl, alkyl phenyl and naphthyl.

13. A polyphosphite according to claim 12 having 4, 5 or 8 phosphorus atoms.

References Cited

UNITED STATES PATENTS 3,092,651  6/1963  Friedman _____ 260—234
3,219,658  11/1965  Friedman _____ 260—234

LEWIS GOTTS, *Primary Examiner.*

JOHNNIE R. BROWN, *Examiner.*

ETHEL LOVE, *Assistant Examiner.*